(12) United States Patent
Striegel et al.

(10) Patent No.: US 10,732,869 B2
(45) Date of Patent: Aug. 4, 2020

(54) CUSTOMIZING CONFIGURATION OF STORAGE DEVICE(S) FOR OPERATIONAL ENVIRONMENT

(71) Applicant: Western Digital Technologies, Inc., San Jose, CA (US)

(72) Inventors: Austin Striegel, Rochester, MN (US); Timothy Lieber, Colorado Springs, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/136,972

(22) Filed: Sep. 20, 2018

(65) Prior Publication Data
US 2020/0097200 A1 Mar. 26, 2020

(51) Int. Cl.
*G06F 3/06* (2006.01)
*G06F 8/65* (2018.01)
*G06F 11/22* (2006.01)

(52) U.S. Cl.
CPC ............ *G06F 3/0632* (2013.01); *G06F 3/061* (2013.01); *G06F 3/0614* (2013.01);
(Continued)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885;
(Continued)

(56) References Cited

U.S. PATENT DOCUMENTS 5,828,583 A 10/1998 Bush et al.
5,884,023 A * 3/1999 Swoboda ............ G06F 11/2268
714/30

(Continued)

FOREIGN PATENT DOCUMENTS

WO WO2013074455 A1 5/2013

OTHER PUBLICATIONS

Heat doesn't kill hard drives. Here's what does; Harris, Robin for Storage Bits; Mar. 8, 2016; retrieved from https://www.zdnet.com/article/heat-doesnt-kill-hard-drives-heres-what-does/ on Feb. 13, 2020 (Year: 2016).*

(Continued)

*Primary Examiner* — Daniel C. Chappell (57) ABSTRACT

Non-limiting examples of the present disclosure relate to execution of in-situ manufacturing for a data storage device. In-situ manufacturing is on-location configuration of a data storage device within an operational environment in which a data storage device is being deployed. In-situ manufacturing occurs at any point after a data storage device is shipped from a manufacturing plant or factory. When an operational environment of the data storage device is known, parameters of the data storage device can be configured (or re-configured) on-location within an operational environment to optimize capacity management as well as performance of the data storage device.

19 Claims, 4 Drawing Sheets

(52) U.S. Cl.
CPC .......... *G06F 3/0634* (2013.01); *G06F 3/0689* (2013.01); *G06F 8/65* (2013.01); *G06F 11/22* (2013.01)

(58) Field of Classification Search
CPC .......... G06F 2206/00–20; G06F 2209/00–549; G06F 2211/00–902; G06F 2212/00–7211; G06F 2213/00–4004; G06F 2216/00–17; G06F 2221/00–2153; G11C 11/00–5692; G11C 13/00–06; G11C 14/00–009; G11C 16/00–3495; G11C 17/00–18; G11C 2216/00–30

See application file for complete search history.

(56) References Cited

U.S. PATENT DOCUMENTS

| | | | |
|---|---|---|---|
| 6,289,484 | B1 | 9/2001 | Rothberg et al. |
| 6,950,967 | B1 | 9/2005 | Brunnett et al. |
| 7,126,906 | B2* | 10/2006 | Iida .................. G06F 3/0677 369/275.3 |
| 7,139,145 | B1 | 11/2006 | Archibald et al. |
| 7,620,772 | B1 | 11/2009 | Liikanen et al. |
| 7,929,234 | B1 | 4/2011 | Boyle et al. |
| 8,004,785 | B1 | 8/2011 | Tsai et al. |
| 8,599,507 | B2 | 12/2013 | Sanvido et al. |
| 8,806,283 | B1* | 8/2014 | Allison .............. G06F 11/2284 365/200 |
| 9,934,871 | B2 | 4/2018 | Squires |
| 10,147,499 | B1* | 12/2018 | Botea .................. G11C 7/20 |
| 10,318,173 | B2* | 6/2019 | Ooi ................... G06F 3/0611 |
| 2002/0194582 | A1* | 12/2002 | Torii ................... G06F 8/65 717/171 |
| 2003/0061263 | A1 | 3/2003 | Riddle |
| 2003/0182075 | A1* | 9/2003 | Sutton ................. G01R 1/025 702/123 |
| 2003/0200049 | A1* | 10/2003 | Sutton ............. G01R 31/31912 702/120 |
| 2008/0189560 | A1 | 8/2008 | Case et al. |
| 2009/0083580 | A1 | 3/2009 | Postage et al. |
| 2010/0121855 | A1* | 5/2010 | Dalia .................. G06F 3/0644 707/741 |
| 2010/0274877 | A1 | 10/2010 | Goetz et al. |
| 2013/0019242 | A1* | 1/2013 | Chen .................. H04L 41/145 718/1 |
| 2013/0179880 | A1 | 1/2013 | Edholm et al. |
| 2014/0122924 | A1 | 5/2014 | Kazi et al. |
| 2014/0181455 | A1* | 6/2014 | Wang ................. G06F 3/0608 711/171 |
| 2015/0149817 | A1* | 5/2015 | Strasser ............. G06F 12/0246 714/6.11 |
| 2015/0160948 | A1* | 6/2015 | Marr ................... G06F 8/65 713/2 |
| 2015/0220385 | A1 | 8/2015 | Wood et al. |
| 2015/0227437 | A1 | 8/2015 | Eidelman |
| 2016/0363972 | A1* | 12/2016 | McNally ............... G06F 1/206 |
| 2018/0150239 | A1* | 5/2018 | Li ..................... G06F 3/0653 |
| 2020/0117534 | A1* | 4/2020 | Yurzola .............. G06F 11/1092 |

OTHER PUBLICATIONS

T. Pattarakavin and P. Chongstitvatana, "Detection of Machines Anomaly from Log Files in Hard Disk Manufacturing Process," 2016 International Conference on Multimedia Systems and Signal Processing (ICMSSP), Taipei, 2016, pp. 60-63. (Year: 2016).*

O. Wongwirat, K. Oonchom and B. Arnuttinanon, "Operation verification of hybrid temperature recorder monitoring system," 2011 IEEE International Conference on Mechatronics and Automation, Beijing, 2011, pp. 1526-1531. (Year: 2011).*

J. Yang and J. Harting, "Improving Storage Subsystem Reliability—A Case Study," 2007 Annual Reliability and Maintainability Symposium, Orlando, FL, 2007, pp. 434-439. (Year: 2007).*

J. Chang and V. Velidandla, "Reliable process monitoring through tool optimization leads to yield improvement," Asia-Pacific Magnetic Recording Conference 2006, Singapore, 2006, pp. 1-2. (Year: 2006).*

Evans, Mark. "Hard Drive Self-Tests." Quantum Corporation. Apr. 26, 1999.

Korean Intellectual Propery Office (KIPO), International Search Report and Written Opinion of the International Searching Authority for International Application No. PCT/US2019/038493 dated Oct. 4, 2019, 15 pages.

* cited by examiner

FIGURE 2

CUSTOMIZING CONFIGURATION OF STORAGE DEVICE(S) FOR OPERATIONAL ENVIRONMENT

TECHNICAL FIELD

Aspects of the disclosure are related to the field of data storage devices and data storage systems.

TECHNICAL BACKGROUND

Data storage devices such as rotating disk drives, solid state drives, and hybrid drives, are typically tested and configured in a manufacturing environment before being shipped. Each storage device is configured the same as every other for the sake of manufacturing and distribution efficiency. However, the operating environments in which the storages devices are ultimately deployed can vary greatly from one to another, with some being more challenging to the optimal performance of a storage device than others. For instance, some environments may be subject to more vibration than others, temperature ranges may vary a great deal, and workloads may vary, all of which can affect the performance of a device in terms of its speed and capacity. Each device is therefore configured during the manufacturing process to ensure that its performance will meet minimum requirements no matter the operational environment.

Such an approach has the drawback of leaving performance on the table in the case of less challenging environments. For example, a storage device that is deployed in a low-vibration environment but configured to withstand a high-vibration environment could run faster if so configured. While such a mismatch may not be overly significant with respect to a single device, it can be very significant in the aggregate. For example, many modern data centers include thousands upon thousands of servers, and thus many thousands of data storage devices, the sub-optimal performance of which is generally undesired and wasteful.

SUMMARY

Non-limiting examples of the present disclosure relate to execution of in-situ manufacturing for a data storage device. In-situ manufacturing is on-location configuration of a data storage device within an operational environment in which a data storage device is being deployed. In-situ manufacturing occurs at any point after a data storage device is shipped from a manufacturing plant or factory. When an operational environment of the data storage device is known, parameters of the data storage device can be configured (or re-configured) on-location within the operational environment to optimize capacity management as well as performance of the data storage device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Non-limiting examples of the present disclosure relate to execution of in-situ manufacturing for a data storage device. In-situ manufacturing is on-location configuration of a data storage device within an operational environment in which a data storage device is being deployed. In-situ manufacturing occurs at any point after a data storage device is shipped from a manufacturing plant or factory. When an operational environment of the data storage device is known, parameters of the data storage device can be configured (or re-configured) on-location within the operational environment to optimize capacity management as well as performance of the data storage device. Exemplary processing operations described herein enables adaptation of mechanical properties and parametric settings of a data storage device on-site within an operational environment and provides technical improvements for a data storage device comprising but not limited to: manipulation of storage capacity on-location in an operational environment; reliability improvement; reduced latency during operation; customized adaptation/tuning to operational environment conditions; aiding efficiency and accuracy in data recovery; intelligent integration of a data storage device with a host system; and reduction of manufacturing costs (e.g., money, time, processing requirements), among other examples.

An exemplary data storage device is a device configured for recording and storing of information (data). Data storage devices may be any type of known data storage device, including but not limited to: rotating disk drives; solid state drives (SSDs); hybrid disk drives or any other type of hard disk drive (HDD). A data storage device may comprise storage media in any known form, where types of storage media may comprise but is not limited to: a magnetic medium, solid state media, an optical medium, portable storage medium (e.g., flash drive, flash memory) or any hybrid combination thereof. An exemplary data storage device may be configured to interface with a host (e.g., system, controller, supervisory node), that is usable to detect characteristics associated with the operational environment in which the data storage device is to be executing. The host system may comprise one or more processing nodes to enable operations described herein to be executed. A non-limiting example of a host system may be a data storage enclosure (e.g., hard disk data storage box or the like), which is configurable to store a plurality of data storage devices. In alternative examples, an exemplary host system may be a computer system that comprises hard disk storage where an exemplary data storage device can be added or connected to. In some examples, a data storage device may be installed in a location that is remote from a host system such as a data storage enclosure. For instance, a host system may store data pertaining to environmental characteristics for an operational environment that a data storage device will operate within. In other instances, the data storage device may detect environmental characteristics of the operational environment itself, with or without assistance from an exemplary host system. In other examples, a data storage device may be directly connected with a host system.

An exemplary data storage device, via a controller (storage controller), may execute testing and device configuration to optimize the data storage device for execution within the operational environment. This may occur when an exemplary data storage device is connected within an operational environment. An operational environment (or operating environment) comprises physical and/or virtual space in which an exemplary data storage device is connected for operation. In one example, the operational environment may be commensurate with a location where a host system executing. In other examples, the operational environment of the data storage device is remote from the host system. The operational environment may further comprise hardware and infrastructure including but not limited to: computer systems, network systems and data storage systems, among other examples. In one example, an operational environment may comprise a data storage system (e.g., the host system or another data storage device such as a data storage enclosure) in which the data storage device is connected for deployment. Moreover, the operational environment may be network-enabled having a connection to the Internet as a means where a host system and a data storage device can interface.

To optimize configuration of the data storage device, environmental characteristics associated with an operational environment are detected. As an example, this may occur when the data storage device is connected to the operational environment. Exemplary environmental characteristics that may be evaluated for configuration of the data storage device comprise but are not limited to: positional data for placement of the data storage device and other computing devices/data storage devices within an operational environment; thermal/temperature data related to the operational environment (including specific devices with the operational environment); vibration data within the operational environment (including specific devices with the operational environment); workload-based data for usage, bandwidth, operations, etc., within the operational environment; and service level agreement (SLA) data specific to the operational environment, among other examples. Exemplary workload data may comprise but is not limited to: processing workload for one or more of: the data storage device and the host system. For instance, such data may include volume of read/write operations across any of: operations that have been previously executed; operations that are scheduled to be executed; and estimated/projected data processing operations, among other examples.

In some examples, an exemplary data storage device is configured to detect environmental characteristics of an operational environment, for example, through one or more sensors embedded in the data storage device. In another example, the host system is configured to detect environmental characteristics and interface with the data storage device (e.g., over a communication link) to provide the detected environmental characteristics (and/or device test data) to the data storage device. In yet another example, detection of environmental characteristics of an operational environment may occur through a combination of the host system and the data storage device detecting environmental characteristics, for example, where one or more sensors in a host system may be configured to detect specific environmental characteristics (e.g., workload, SLA data, vibration) of the operational environment and one or more sensors of an exemplary data storage device may be configured to detect other environmental characteristics (e.g., temperature, vibration) of the operational environment. Processing operations described herein for testing and configuration of a data storage device may be performed by any of: an exemplary storage controller of a data storage device; an exemplary component of a host system (e.g., controller or supervisory node); and/or a combination thereof.

An exemplary storage controller may be programmed for customizing a configuration (or re-configuring) of the data storage device for the operational environment that it is to be operating within. In doing so, the storage controller is configured to execute a plurality of processing operations. For example, the storage controller is configured to launch the data storage device in a configuration mode, which is usable to adapt the data storage device to the operational environment before the data storage device is usable for workload processing. That is, the configuration mode is a directed manufacturing mode that is used for in-situ manufacturing of the data storage device. While in an exemplary configuration mode (or directed manufacturing mode), the storage controller may interface with the host system to obtain device test data and/or environmental parameter data (e.g., detected environmental characteristics) associated with the operational environment. The storage controller may utilize the device test data and the environmental parameter data to execute testing processing for tuning environmental-specific parameters during configuration of the data storage device. That is, the data storage device may be optimized for the operational environment in which the data storage device is connected. Based on results of the executed testing, the storage controller further executes processing operations for configuring (or re-configuring) the data storage device. For example, the storage controller may utilize testing results to format/re-format the data storage device, where the custom environmental parameters pertain to parameters for operation (e.g., mechanical properties) of the data storage device and specific components. Moreover, configuration of such custom parameters comprises writing the custom environmental parameters on the storage media of the data storage device, where that written data may by be accessed by firmware during operation of the data storage device.

As referenced in the foregoing, testing and configuration of a data storage device may occur in an exemplary configuration mode. Based on the customized configuration of the data storage device, the storage controller may be configured to switch modes of the data storage device out of the configuration mode and into an operational mode. An exemplary operational mode is used for workload processing, whereby the operational mode is that which a customer may implement functionality of the configured data storage device to execute its processing operations (e.g., read/write operations). In one example, toggling between a configuration mode and an operational mode occurs based on successful formatting/re-formatting of the data storage device. For instance, once the custom environmental parameters are written on the storage media, an exemplary storage controller may be programmed to access the operational mode. The custom environmental parameters may be accessed during execution of firmware, which may be utilized to direct operation of the configured data storage device. In some instances, exemplary firmware may be updated before enabling processing operations. Exemplary firmware may be updated periodically, where either the storage controller (of the data storage device) or the host system are configured to push firmware updates to the data storage device.

In further examples, an exemplary data storage device may be a component of a host storage system. For example, a host storage system may be a hard disk drive (HDD) storage box (or plurality of HDD storage boxes) that may comprise a plurality of data storage drives. Exemplary data storage drives are examples of data storage devices, which have been referenced in the foregoing description. An exemplary host storage system may comprise a supervisory node that is connected with the plurality of data storage drives. An exemplary supervisory node is configured to interface with a storage controller of each of the plurality of data storage drives. Any of the supervisory node, a storage controller of a disk drive or a combination thereof, is configured to execute processing operations for in-situ configuration as described herein. In one example, the supervisory node connects with a storage controller of a disk drive, whereby the supervisory node communicates data necessary for the storage controller to configure itself.

Figure 1:
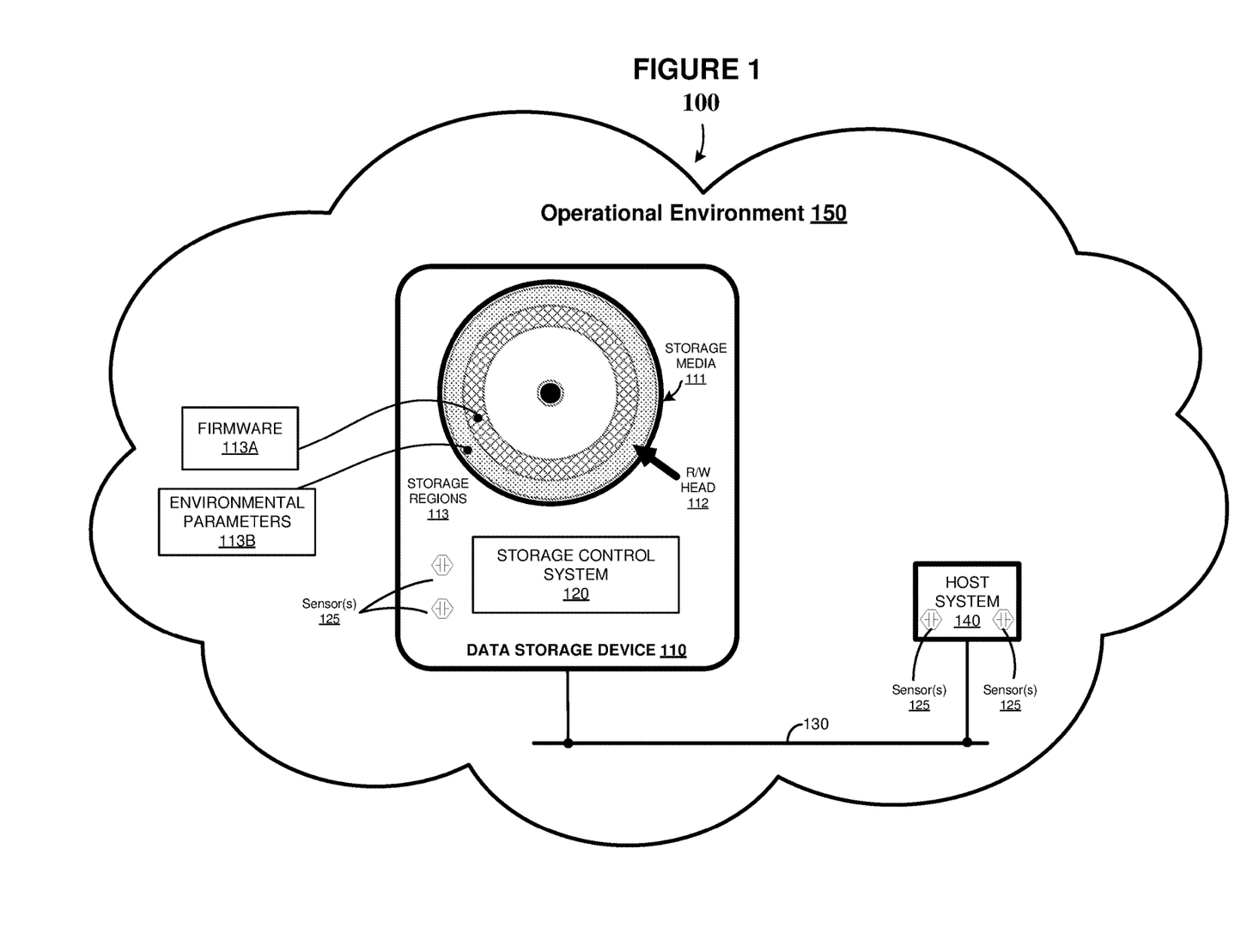
FIG. 1 is a system diagram illustrating an exemplary data storage system.

FIG. 1 is a system diagram illustrating data storage system 100. Data storage system 100 includes data storage device 110 and host system 140. Data storage device 110 may be any of the previously described examples of data storage devices described herein including rotating drives, solid state drives and hybrid drives, among other examples. The host system 140 may be any of the examples of a host system (or host storage system) as described in the foregoing description. Exemplary host systems may be network connected and comprises computing devices such as personal computers, workstations, server systems, cloud storage systems and other electronic computing/peripheral devices as known to one skilled in the field of art. The host system 140 may be configured as a data storage system (e.g., host storage system), where the host system 140 may manage operations for storing and retrieving data. In one example, an exemplary host system 140 is data storage enclosure that is configured to interface with a plurality of data storage devices (e.g., hard disk drive (HDD) storage enclosure (or plurality of HDD storage enclosures) that comprises (or is connected with) a computing system (e.g., server)).

The host system 140 may be specific to a specific entity or business, customer, etc., that is integrating an exemplary data storage device 110 with its host system 140. The host system 140 may be executing in an exemplary operational environment 150. As described in the foregoing, an exemplary operational environment 150 (or operating environment) comprises physical and/or virtual space in which the data storage device 110 is connected for operation. In one example, the operational environment 150 may be commensurate with a location where the host system 140 executing. In other examples, the operational environment 150 of the data storage device 110 is remote from the host system 140. Furthermore, an exemplary operational environment 150 for a data storage device 110 may be a data storage system (e.g., the host system or another data storage device such as a data storage enclosure). That is, the operating environment 150 may further comprise hardware and infrastructure including but not limited to: computer systems, network systems and data storage systems, among other examples. The operational environment 150 may be network-enabled having a connection to the Internet as a means where a host system and a data storage device can interface.

An exemplary host system 140 may comprise electronic processing components (e.g., computer system, processors (processing nodes), microprocessors, circuits, controllers, sensors) that may be configured to control any and of: operation of host system 140; interfacing with a data storage device 110; and/or specifically configured for detection of environmental characteristics associated with the operating environment 150. For example, the host system 140 may comprise one or more exemplary controllers or supervisory nodes that interface with data storage device 110 to enable processing operations described herein. An exemplary controller or supervisory node may be any of the electronic processing components described above. In some alternative examples, an exemplary controller of the host system 140 and/or supervisory node may be software configured as one or more virtual machines/nodes.

Exemplary environmental characteristics of an operational environment 150 that may be evaluated to configure data storage device 110 may comprise but is not limited to: positional data for placement of the data storage device and other computing devices/data storage devices within an operational environment; thermal/temperature data related to the operational environment (including specific devices with the operational environment); vibration data within the operational environment (including specific devices with the operational environment); workload-based data for usage, bandwidth, operations, etc., within the operational environment; and SLA data specific to the operational environment, among other examples. Exemplary workload data may comprise but is not limited to: processing workload for one or more of: the data storage device 110 and the host system 140. For instance, such data may include volume of read/write operations across any of: operations that have been previously executed; operations that are scheduled to be executed; and estimated/projected data processing operations, among other examples. Host system 140 may comprise one or more sensors 125 for detecting exemplary environmental characteristics. For example, the host system 140 may comprise but is not limited to including: one or more thermal sensors that can detect temperature within the operational environment 150 (e.g., server room(s), specific HDD storage (e.g., boxes)); one or more accelerometers/accelerometer sensors for vibration sensing; as well as sensors/circuits/processors that are configured to evaluate any of: specifications of computing devices, storage capacity (including available and used space), telemetric analysis data associated with computing devices and usage, device connection data, diagnostic data, network connection/usage data, log data for processing operations/bandwidth/errors and SLA-specific configurations/parameters, among other examples.

Moreover, an exemplary host system 140 may comprise networking capabilities where a host system 140 may establish a network connection with an exemplary communication network/networks through an exemplary communication interface system. For example, the host system 140 may connect obtain updated data (e.g., firmware, SLA, configuration data, patches, updates, etc.) via a network connection. An exemplary network connection may be established in accordance with various communication protocols, combinations of protocols, or variations thereof as known to one skilled in the field of art. Examples of a communication network include intranets, internets, the Internet, local area networks, wide area networks, wireless networks, wired networks, virtual networks, software defined networks, data center buses, computing backplanes, or any other type of network, combination of network, or variation thereof.

A communication interface 130 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), serial attached SCSI (SAS), serial advanced technology attachment (SATA) as well as any other suitable communication protocol, variation, or combination thereof. In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Data storage device 110 and host system 140 communicate over storage interface 130. An exemplary storage interface 130 may include one or more links, although a single link is shown in FIG. 1. Storage interface 130 may comprise a storage or disk interface, such as serial attached ATA (SATA), Serial Attached small computer system interface (SAS), FibreChannel, universal serial bus (USB), small computer system interface (SCSI), InfiniBand, non-volatile memory host controller interface, peripheral component interconnect express (PCIe), ethernet, internet protocol (IP), or other parallel or serial storage or peripheral interfaces, including variations and combinations thereof. Alternatively, exemplary links connecting data storage device 110 and the host system 140 may occur through wireless connection including but not limited to infrared, Bluetooth and WiFi, among other examples. The data storage device 110 and the host system 140 may each be configured with connectors that enable interfacing via the storage interface 130.

Data storage device 110 comprises storage media 111. Storage media 111 may be any type of memory that may be utilized to store computer data. Storage media 111 may comprise any of the examples of storage media previously provided in the foregoing description. Memory can include volatile and nonvolatile, removable and non-removable media implemented in any method or technology for storage of information, such as computer readable instructions, data structures, program modules, or other data. Memory can be implemented as a single storage device but can also be implemented across multiple storage devices or sub-systems co-located or distributed relative to each other. Examples of storage media 111 include random access memory, read only memory, magnetic disks, hybrid magnetic-solid state drives, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. As such, in some non-limiting examples, storage media 111 may be one or more rotating media, which can comprise platters of a hard disk drive in some examples.

Storage media 111 may comprise a plurality of storage regions 113 (e.g., partitions, sectors, directories, folders). During manufacturing, one or more storage regions 113 may be loaded with data to enable processing operations described herein to be executed. Data storage device 110 may further comprise an exemplary R/W head 112 to target reading and writing operations to specific storage regions 113 of the storage media 111. In some instances, priority may be given for execution of read/write operation. Giving priority for read/write operations may comprise keeping R/W head 112 over a current hot region during at least idle times of data storage device 110. A current hot region may also be used for incoming write data instead of other regions of storage media 111. In this manner, incoming write data is sequentially written to the current hot region, i.e. region 1, and movement of R/W head 112 is limited to a sub-portion of storage media 111. In examples of rotating storage media, such as a hard disk drive, R/W head 112 is prioritized to a 'ring' of blocks as a restricted range over the rotating storage media that defines region 1, and R/W head 112 is positioned over region 1 when read or write transactions are not presently being performed. In further examples, giving priority for read operations occurring in data storage device 110 includes returning a position of read/write head 112 for storage media 111 to the hot region upon completion of any storage transactions on storage media 111.

In one example, exemplary firmware 113a is stored on at least one of the storage regions 113. Processing operations described herein are not tied to a specific type of firmware, where exemplary data storage devices 110 may be configured to work with any firmware. Firmware 113a may be utilized to direct operation of the configured data storage device. In doing so, firmware 113a may comprise processes, programs, or components, such as operating system software, database software, or application software. Exemplary firmware 113a for executable operation of a data storage device 110 may be pre-loaded on the storage media 111, where that version of firmware is usable for execution of the data storage device 110 in an operational mode. In further instances, firmware 113a may be updated after manufacturing and shipment of the data storage device 110, where an exemplary storage controller may be configured to check for an update to the firmware 113a, for example, prior to execution of the data storage device in an operational mode. Firmware 113a may also comprise software or some other form of machine-readable processing instructions executable by processing circuitry. In at least one implementation, the program instructions may include first program instructions that direct an exemplary storage control system 120 to write data into a specific region of the storage regions 113. In some instances, the storage control system 120 may restrict read and/or write access to certain storage regions 113 based on the mode in which the data storage device 110 is operating. For example, if the data storage device 110 is operating in an operational mode, storage regions 113 associated with configuration data may not be accessible. As referenced in the foregoing, firmware 113a may be updated periodically. In such examples, a new version of firmware 113a may either be overwritten over a previous version or the new version of the firmware 113a may be written into a different region of the storage regions 113. The latter processing may be useful in instances where a version of the firmware 113a is required to be rolled-back.

In further examples, exemplary storage regions 113 may comprise storage of exemplary environmental parameters 113b that are used to adapt the data storage device 110 to the operational environment 150 (e.g., through formatting and/ or mapping processing operations). Exemplary environmental parameters 113*b* may correlate to mechanical operation of the exemplary data storage device 110 and may be set based on results of execution of a testing script that evaluates environmental characteristics of the operational environment 150. The environmental parameters 113*b* may correlate to parametric-specific decisions that can be applied in different environmental circumstances. Exemplary environmental parameters 113*b* may be set for current conditions associated with an operational environment 150 as well as future conditions (e.g., multiple different scenarios projected from testing results). Non-limiting examples of such scenarios may comprise but are not limited to: what happens in an instance where the temperature elevates/drops a certain number of degrees; what happens if or what happens if a certain level of free storage space on the storage media 111 is exceeded; what happens if vibration levels increase/decrease; what happens if an SLA changes; what happens if a workload increases and there is a queue of operations to be performed, among other exemplary scenarios.

As referenced above, exemplary environmental parameters 113*b* may correlate to mechanical operation of the exemplary data storage device 110 and may be set based on results of execution of a testing script that evaluates environmental characteristics of the operational environment 150. An exemplary storage control system 120 (or alternatively the host system 140) is programmed to execute processing operations for testing evaluation and determination of exemplary environmental parameters 113*b*. The environmental parameters 113*b* may be configured to apply to any mechanical components of data storage device that may affect read and/or write operations of the data storage device 110. For instance, environmental parameters 113*b* may be set to manage components that affect data recording processing and/or performance and reliability of the data storage device 110. In one example, environmental parameters 113*b* may be set corresponding to mechanical components that are associated with control of: (positional) error signal data, thermal analysis data, vibration data, and workload data, among other examples. In more specific instances, parameters may be set for control over specific features of the data storage device 100 that include but are not limited to: bits per inch; tracks per inch; soft error rate; hard error rate; track interference refresh rate; R/W head fly heights; R/W head pressure; capacity settings; margins related to any of the described features and fan operation; among other examples. Over time, environmental characteristics associated with the operational environment 150 may change, leading to re-configuration of exemplary environmental parameters 113*b*. In varying examples, the storage control system 120 is either configured to re-write a new version of the environmental parameters 113*b* over an existing version (e.g., in the same storage region) or add the new version to a new storage region of the storage regions 113.

Exemplary environmental parameters 113*b* may vary on a device by device basis, even in instances where a plurality of data storage devices 110 are included within a data storage box/enclosure. For instance, margins needed for reserve of specific parameters may be tweaked differently for data storage devices 110 being positioned in different locations within the operational environment 150. Settings associated with environmental parameters 113*b* may also be updated scheduled situation as well as in real-time (or near real-time). In some examples, update may occur conditionally or for a specific duration of time. For instance, a host storage system normally executes a large amount of sequential data writing operations and does not do a lot of re-writing of its data. In that example, if the host storage system has workload knowledge that it would be instead executing a plurality of re-writing operations, margins may be able to be regained/adjusted to account for the workload change.

As referenced previously, the data storage device 110 further comprises storage control system 120. Storage control system 120 comprises one or more hardware components, software components or combination thereof, where the storage control system 120 is programmed to control processing operations of data storage device 110. An exemplary storage control system 120 may comprise one or more storage controllers. The storage controller may be any of the electronic processing components described above. In some alternative examples, an exemplary storage controller of the data storage device 110 may be software programmed to run on top of an exemplary electronic processing component. Data storage device 110 may further comprise an exemplary communication interface system, as described in the foregoing description, which enables interfacing with an exemplary host system 140 and/or other computing devices. In some examples, an exemplary data storage device 110 may further comprise one or more sensors 125, as described in the foregoing description, which may enable direct detection of environmental characteristics of an operational environment 150 by the data storage device 110.

In operation, the storage control system 120 is configured to execute processing, via an exemplary storage controller, for customizing configuration of the data storage device 110 to an operating environment 150 in which the data storage device 110 is being added. In some examples, configuration of the data storage device 110 comprises re-configuration of the data storage device 110 within the operating environment 150, which may occur when the data storage device 110 is moved to a new position/location within the operating environment 150. The storage control system 120 is programmed to handle any processing operations described herein within an exemplary configuration mode (e.g., directed manufacturing mode) and an exemplary operational mode. For example, storage control system 120 interfaces with host system 140 to execute testing operation to configure custom environmental parameters for operation of the data storage device 110 within an operational environment 150.

In doing so, an exemplary storage controller may be configured to run processing of device test data (e.g., script/code/module for executing multi-stage diagnostic configuration testing) using the environmental characteristics associated with the operational environment 150. An exemplary device testing module (e.g., software) is utilized to execute processing operations for sequencing, configuration and logging of test data and test results. Manufacturing test results may be saved from each process step by gathering the binary logs as each process step is complete. These logs can be saved on a local testing server (e.g., within the operational environment or connected via a distributed network connection) or storage media, along with the drives customized values stored in the reserved area of storage media of the data storage device 110. Exemplary multi-stage diagnostic configuration testing may comprise but is not limited to: functional testing (e.g., basic functionality tuning including capacity); quality testing (e.g., defect mapping, track-to-track testing); and performance testing (e.g., performance tuning including workload optimization).

Once testing processing is completed, the storage control system 120 may be configured to store testing results (e.g., the customized environmental parameters 113*b*) as non-volatile information. The customized environmental parameters are then used to configure/reconfigure the data storage device 110. Firmware once its running, runs per the configurations set for a configured data storage device 110. Processing operations to configure/re-configure the data storage device 110 may comprise a sequence of processing operation to reformat the drive and recharacterize any parameters that might change based on reformatting (e.g., re-write all sectors at new track pitches, set new margins for bits per inch, among other customized environmental parameters). Exemplary firmware overlays the configured data storage device 110, where the storage control system 120 downloads the test process and executes the same. Firmware may be overlaid over results of the testing processing (e.g., testing results), where the drive may become operational (e.g., toggled from a configuration mode to an operational mode), for example, once the data storage device has been successfully configured for the operational environment 150. In examples where it is determined that the firmware is required to be updated, processing operations occur to update the firmware before enabling the data storage device 110 to enter the operational mode.

While in the operational mode, the data storage device 110 may receive read or write transactions over storage interface 130 issued by host system 140 or via commands/processing operations issued through the storage control system 120. Responsive to read transactions, data storage device 110 retrieves data stored upon media 111 with read/write (R/W) head 112 for transfer to host system 140 or subsequent processing by the storage control system 120. Responsive to write transactions, data storage device 110 stores data onto storage media 111 with R/W head 112. R/W head 112 is positioned over different areas of media 111 to read or write associated data. It should be understood that other components of data storage device 110 are omitted for clarity in FIG. 1, such as preamps, transceivers, processors, amplifiers, motors, servers, armatures, enclosures, and other electrical and mechanical elements.

Figure 2:
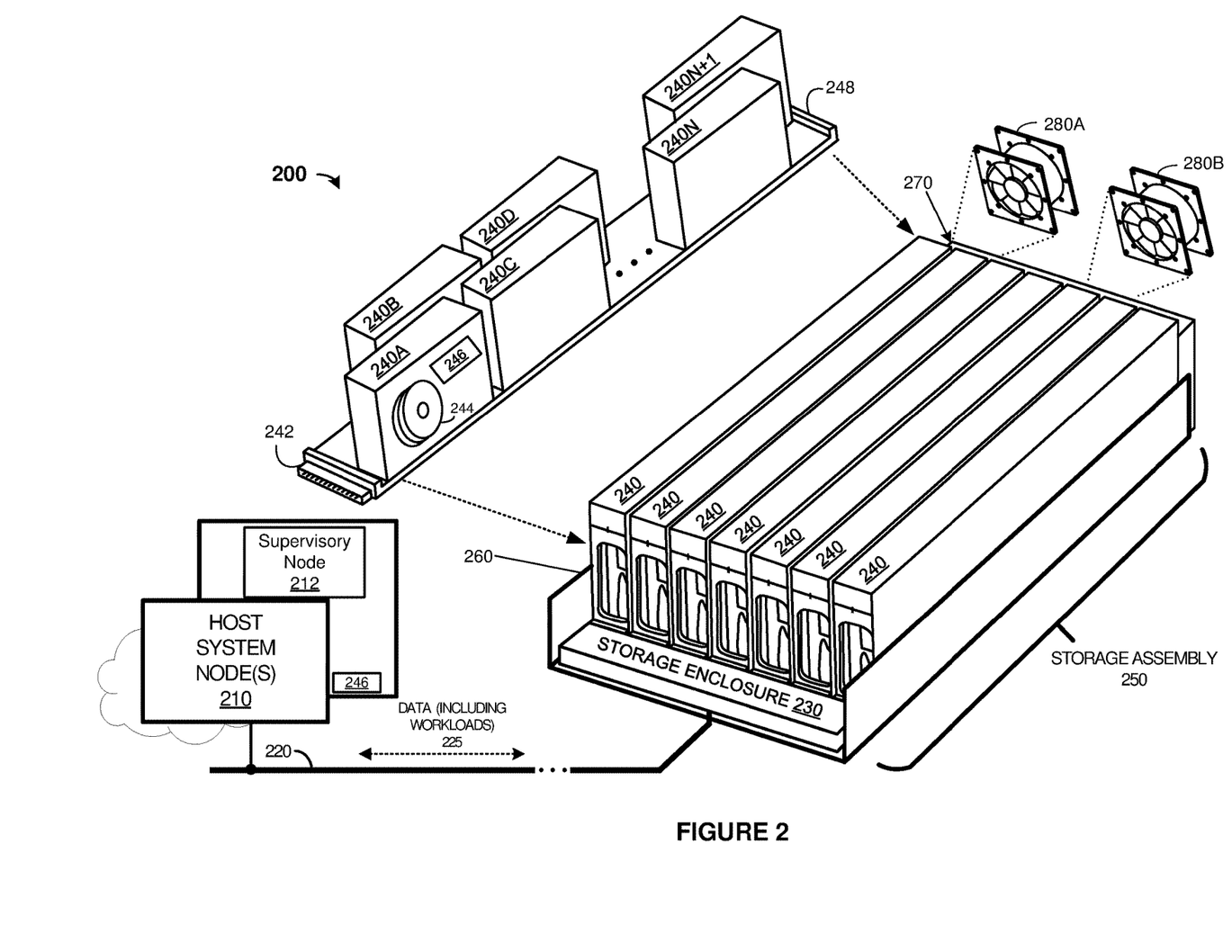
FIG. 2 depict system diagrams illustrating various views of an example data storage system.

FIG. 2 depict system diagrams illustrating various views of an example data storage system 200. In one example, the data storage system 200 is the host system. In another example, the data storage system 200 may be a data storage enclosure that is separate (and/or remote) from the host system (e.g., host system node(s) 210). An exemplary data storage system 200 comprises host system nodes 210 and a storage enclosure 230, a storage assembly 250, a chassis 260, a power source 270, fans (280A and 280B), a plurality of data storage devices 240. Further components of data system 200 are also subsequently described. As an example, the host system is a hard disk drive storage enclosure or the like, where the host system comprises a plurality of components that enable execution of processing operations described herein including the description of data system 100. Examples of data storage devices have been provided in the foregoing description, where data storage devices 240 may be any of the provided examples.

The host system node(s) 210 and the storage enclosure 230 communicate over storage link 220. The host system node(s) 210 comprise processing components that enable execution of processing operations described in the foregoing description pertaining to a host system, where the host system may manage an exemplary operational environment (or a separate operational environment from that of a data storage device), customer interactions as well as interfacing with exemplary data storage devices (e.g., data storage drives 240). An exemplary host system node 210 is a supervisory node (or nodes) as described in the foregoing description. Although one storage assembly 250 is shown in FIG. 2, it should be understood that more than one storage assembly could be included and linked to data storage system 200 or other access systems, such as in a data storage environment employing many data storage arrays.

Storage assembly 250 comprises a storage assembly with associated enclosure and structural elements, which is insertable into a rack that can hold other storage assemblies, such as a rackmount server environment. The storage enclosure 230 can further comprise structural elements configured specifically for insertion of the plurality of data storage devices 240, such as chassis 242 and trays 248. Storage assembly 250 may also include at least one external connector for communicatively coupling storage devices to link 220.

Storage assembly 250 may comprise a redundant array of independent disks (RAID) array, or a JBOD ("Just a Bunch Of Disks") device which include a plurality of independent disks that can be spanned and presented as one or more logical drives to host system node(s) 210. In some examples, storage assembly 250 comprises a virtual bunch of disks (VBOD) which adds one or more layers of abstraction between physical storage drives and external interfaces. A VBOD can employ various types of magnetic recording technologies and abstract front-end interactions from the particular recording technology. Storage link 220 may include one or more links, although a single link is shown in FIG. 2. Description of storage link 220 aligns with storage interface 130 as described in the description of FIG. 1. As referenced above, the host system node(s) 210 aligns with that of host system 140 as described in the description of FIG. 1. Exemplary host system node(s) 210 may comprise a supervisory node 212 as well as one or more sensors 246, as described in the foregoing description of FIG. 1. Host system node(s) 210 may be configured to interface with the storage enclosure 230, via the storage link 220, to communicate data 225 therebetween. Exemplary data 225 includes information for configuring each of the plurality of data storage devices 240 including environmental characteristics, testing data, firmware data (updates) as well as workload data. As referenced above, workload-specific data may be transmitted as environmental characteristics where a data storage device may utilize such information to customize its configuration. Alternatively, an exemplary host system may configure an individual data storage device. Workload data also may be transmitted to individual data storage devices 240, which may comprise read/write operations, among other data storage requests.

As referenced above, the storage enclosure 230 may include a plurality of data storage devices 240 (e.g., hard disk drives (HDDs)), each mounted in an associated carrier tray which is further encased in an enclosure to form a storage carrier, such as shown for HDDs 240A-240N+1. A connector may be provided for each of storage carriers to couple the HDDs to an associated storage server or the host system node(s) 210. Each HDD can be inserted into and removed from an associated storage carrier, and that storage carrier can then be inserted into an associated guide or track of storage assembly 250. Other configurations are possible, such as individually-mounted HDDs.

An example detailed view of data storage system 200 illustrates that an individual data storage device 240 may comprise the storage media 244 (e.g., rotating storage media) and an exemplary sensor(s) 246. Each HDD can comprise similar elements, such as rotating storage media, read/write heads, and optionally vibration sensors, although variations are possible among HDDs. HDDs can include further elements, such as armatures, preamps, transceivers, processors, amplifiers, motors, servers, cases, seals, enclosures, sensors and other electrical and mechanical elements. It should be understood that variations are possible for HDD 240A or other HDDs. Each HDD can instead comprise hybrid disk drives, which include rotating media and solid-state storage components, which work in tandem. In further examples, solid state drives (SSDs), optical storage drives, or other non-transitory computer-readable storage devices are employed.

Storage assembly 250, of the storage enclosure 230, further comprises a power assembly 270, which comprises power electronics as well as one or more ventilation fans 280a and 280b to provide airflow to storage assembly 250. Storage assembly 250 also includes storage chassis 260 which comprises structural elements to house and structurally support the elements of storage assembly 260. Chassis 260 can include chassis elements, enclosures, cases, frames, fastening elements, rackmount features, ventilation features, among other elements. Power supply elements are included to convert external power sources or provide various forms of electrical power to the elements of storage assembly 250. Fans 280A-280B can comprise any fan type, such as axial-flow, centrifugal and cross-flow, or other fan types, including associated louvers, fins, or other directional elements, including combinations and variations thereof.

Figure 3A:
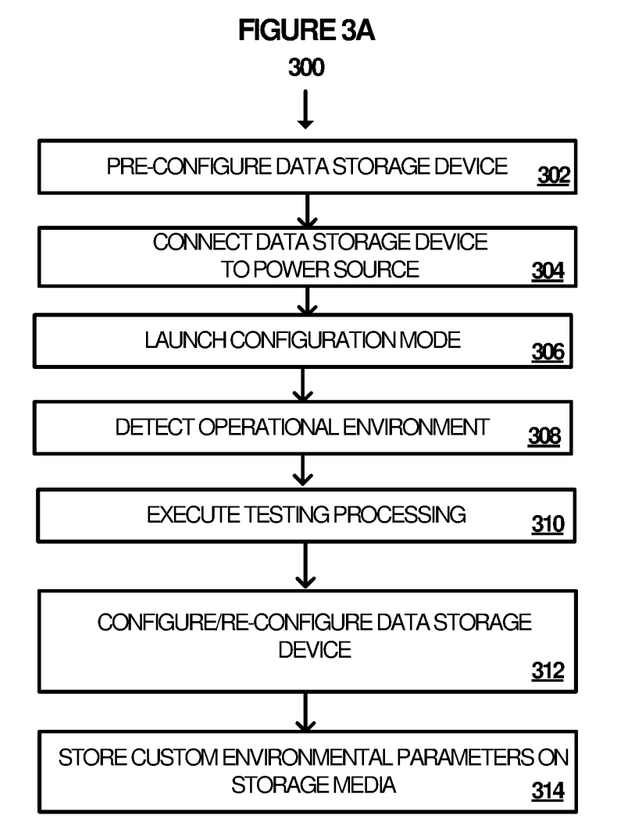
FIGS. 3A and 3B are exemplary flow diagrams illustrating method operations for implementing in-situ configuration of a data storage device.
Figure 3B:
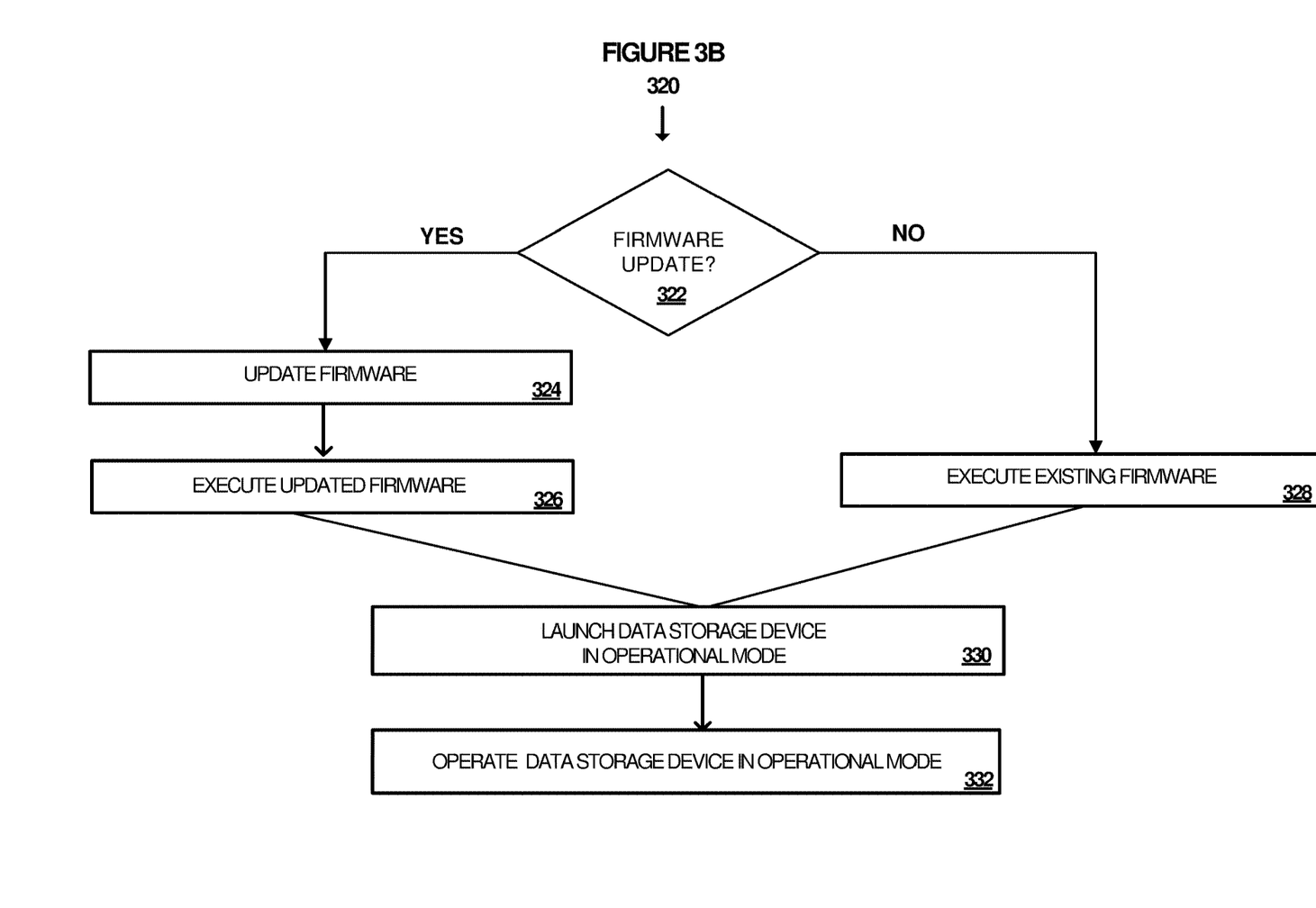

FIGS. 3A and 3B are exemplary flow diagrams illustrating method operations for implementing in-situ configuration of a data storage device. FIG. 3A illustrates method 300 providing a process flow for customized configuration (or re-configuration) of an exemplary data storage device. An exemplary data storage device is data storage device 110 (FIG. 1). Another example of an exemplary data storage device is data storage drive/device 240 (FIG. 2). FIG. 3B illustrates method 320 providing a process flow for execution of the configured (or re-configured) exemplary data storage device. Processing operations described in methods 300 and 320 may be executed by components described in FIGS. 1 and 2, where the foregoing description supports and supplements the recited processing operations herein.

Method 300 (FIG. 3A) begins at processing operation 302, where one or more operations are executed to pre-configure a data storage device. Processing operation 302 may occur during factory manufacturing of an exemplary data storage device. As described in the foregoing, a data storage device may be pre-configured in a factory setting before the data storage device is shipped out and eventually deployed. The environment in which the data storage device is to be deployed is unknown at the time the data storage device is initially configured in the factory. Thus, processing operation may pre-configure a data storage device to meet minimum performance standards so that the data storage device can account for the most challenging operational environments. Baseline tuning and programming of components of the data storage device may occur before the device is shipped out for operational use. Processing operations for execution of factory configuration (including baseline tuning) are known to one skilled in the field of art. Processing operation 302 may further comprise loading exemplary firmware on a storage media of the data storage device. The firmware may be executed to enable operation of the data storage device, for example, in an operational mode after the configuration of the data storage device is updated (re-configured) for a specific operational environment.

Flow of method 300 may proceed to processing operation 304, where the data storage device is connected to a power source. Processing operation 304 may comprise connecting the data storage device with an exemplary host system or other data storage system such as a data storage enclosure. As a non-limiting example, the data storage device may be connected to a positional slot in an HDD enclosure or the like. Processing operation 304 may trigger launching of an exemplary configuration mode of the data storage device.

In processing operation 306, the data storage device is launched in the configuration mode. An exemplary configuration mode has been described in detail in the foregoing description. Operation of method 300 may proceed to processing operation 308, where an exemplary operational environment is detected. Examples of an operational environment have been provided in the foregoing description. While in an exemplary configuration mode (or directed manufacturing mode), a storage controller (of the data storage device) may interface with the host system to obtain device test data and/or environmental parameter data (e.g., detected environmental characteristics) associated with the operational environment. The storage controller (or the host system) may utilize the device test data and the environmental parameter data to execute testing processing (processing operation 310) for configuring the data storage device for the exemplary operational environment. Exemplary processing operations for execution of testing processing have been provided in the foregoing description.

Based on results of the executed testing, flow of method 300 may proceed to processing operation 312. At processing operation 312, the storage controller (or the host system) further executes operations for configuring (or re-configuring) the data storage device. For example, the storage controller may utilize testing results to format/re-format the data storage device, where mechanical components and/or setting for the data storage device are set to custom environmental parameters determined based on the testing results. That is, custom environmental parameters pertain to parameters for operation (e.g., mechanical properties) of the data storage device and specific components as well as other settings/metadata associated with configuration of the data storage device (that may be used for subsequent interfacing with other data storage systems including host system(s)). Moreover, configuration of the data storage device comprises storing/writing (processing operation 314) the custom environmental parameters on the storage media of the data storage device. Processing operation 314 may further enable written data pertaining to the custom parametric decisions to be accessed by firmware during operation of the data storage device in an operational mode. General processing operations for configuring or formatting a storage device are known to one skilled in the field of art.

Method 320 (FIG. 3B) provide a continued example of method 300 (FIG. 3A), where method 320 picks up at the point where an exemplary data storage device has been successfully configured/re-configured. In examples where formatting has not completed successfully, the storage controller may interface with the host system to identify potential issues and fixes as known to one skilled in the field of art.

Method 320 begins at decision operation 322, where it is determined whether there is an update to the firmware for operation of the configured data storage device in an exemplary configuration mode.

In examples where updated firmware is detected, for example, through interfacing with an exemplary host system (via network connection), flow of decision operation 322 branches YES and processing of method 320 proceeds to processing operation 324. In processing operation 324, the firmware, storing on the storage media of the data storage device, is updated. In one example, processing operation 324 may comprise operations such as: communicating with the host system to identify that a new version of the firmware is available; receiving, from the host system, the updated firmware; and writing the updated firmware on the storage media. Once the firmware has been updated, flow of method 300 may proceed to processing operation 326, where the updated firmware is executed.

In examples where no update to firmware is detected, for example, through interfacing with an exemplary host system (via network connection), flow of decision operation 322 branches NO and processing of method 320 proceeds to processing operation 328. In processing operation 328, the existing firmware (e.g., stored on the storage media of the data storage device) is executed.

In either example, flow of method 320 may proceed to processing operation 330, where the data storage device is launched in the operational mode. An exemplary operational mode has been described in detail in the foregoing description. Flow of method 300 may further proceed to processing operation 332, where one or more processing operations are executed to operate the data storage in the operational mode. Operation of the data storage device may comprise application of the custom environmental parameters while the data storage device receives workload processing operations. For example, processing operation 332 comprises execution of read/write operations are enabled for the configured data storage device. This processing may be achieved where the operational mode is accessible through execution of the firmware.

In examples described herein, logic at a host system level (or data storage device level) is able to detect environmental characteristics of an exemplary operating environment to optimally configure an exemplary data storage device (or plurality of data storage devices). Novelty further exists in the interaction between the host system and an exemplary data storage device. In one instance, an exemplary host system may transmit, to a data storage device, testing data (e.g., device test data and environmental characteristics of the operational environment) to enable customized configuration of the data storage device. After testing operation, where an exemplary data storage device is configured to some capacity based on the environmental evaluation, the host system may further communicate data to enable the data storage device to synchronize with the host system and enter an operational mode. Such data may be written into the storage media of the data storage device, for example, to enable continued interfacing between the host system and the data storage device in subsequent instances.

As such, each individual data storage device may be variably configured, which may also include varying capacity. This provides technical benefits including but not limited to: flexibility in customizing device characteristics of an exemplary data storage device (as compared with standard storage devices); re-balancing of workloads across one or more data storage devices to improve overall performance and capacity; and improved reliability of an exemplary data storage device because the data storage device is optimized for the operational environment, among other examples. Additionally, examples described herein may also reduce the cost of storage device manufacturing as well as reduce the scrap cost associated with standard storage devices.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A data storage device comprising:
   rotating storage media; and
   a storage controller that is connected to the storage media and configured to connect to a host system, wherein the storage controller is programmed to customize a configuration of the data storage device for an operational environment of the data storage device through execution of processing operations that comprise:
      launching a configuration mode for the data storage device before the data storage device is usable for workload processing,
      receiving from the host system or detecting while in the configuration mode, environmental parameter data associated with the operational environment, wherein the environmental parameter data corresponds to environmental parameters that affect mechanical components that affect read operations or write operations or read and write operations of the data storage device,
      configuring the data storage device with custom environmental parameters, based on the environmental parameter data, pertaining to mechanical properties of the data storage device,
      writing the custom environmental parameters to non-volatile storage of the data storage device for access by firmware during operation of the data storage device for directing operation of the data storage device, formatting the data storage device based on the custom environmental parameters used to adapt the mechanical operation of the data storage device, including rewriting sectors at a particular track pitch, and operating the data storage device in an operational mode, in which the data storage device is usable for performing read/write operations, based at least in part on the custom environmental parameters.

2. The data storage device of claim 1, wherein:
the storage media comprises the firmware stored on the storage media;
the processing operations further comprise executing the firmware in the operational mode; and
the operating comprises executing the firmware while the data storage device is in the operational mode.

3. The data storage device of claim 1, wherein:
the storage media comprises the firmware stored on the storage media;
the processing operations further comprise updating the firmware; and
the operating comprises executing the updated firmware while the data storage device is in the operational mode.

4. The data storage device of claim 1, wherein the processing operations further comprise:
switching the data storage device to the operational mode, from the configuration mode, which enables customer usage of the configured data storage device.

5. The data storage device of claim 1, wherein the storage controller is further configured to automatically launch the configuration mode based on a connection of the data storage device to a power source.

6. The data storage device of claim 1, wherein the environmental parameter data comprises one or more selected from a group consisting of: error signal data, thermal analysis data, vibration data, and workload data including processing workload for one or more of the data storage device and the host system.

7. The data storage device of claim 1, wherein the environmental parameters are set for control over one or more features of the data storage device from a group consisting of: bits per inch, tracks per inch, soft error rate, hard error rate, track interference refresh rate, read/write head fly heights, read/write head pressure, capacity settings, and fan operation.

8. A host storage system comprising:
a supervisory node connected with a system that is configured to house a plurality of data storage devices, wherein the supervisory node is configured to interface with a storage controller of a data storage device from the plurality of data storage devices;
and wherein the storage controller is configured to:
launch a configuration mode for the data storage device before the data storage device is usable for workload processing,
receive from the supervisory node or detect while in the configuration mode, environmental parameter data associated with an operational environment of the data storage device, wherein the environmental parameter data corresponds to environmental parameters that affect mechanical components that affect read operations or write operations or read and write operations of the data storage device,
configure the data storage device with custom environmental parameters, based on the environmental parameter data, pertaining to mechanical properties of the data storage device,
write the custom environmental parameters to non-volatile storage of the data storage device for access by firmware during operation of the data storage device for directing operation of the data storage device,
format the data storage device based on the custom environmental parameters used to adapt the mechanical operation of the data storage device, including setting new margins for bits per inch, and
operate the data storage device in an operational mode, in which the data storage device is usable for performing read/write operations, based at least in part on the custom environmental parameters.

9. The host storage system of claim 8, wherein:
the data storage device comprises storage media that stores data including the firmware;
the storage controller is further configured to update the firmware; and
the operate comprises executing the updated firmware while the data storage device is in the operational mode.

10. The host storage system of claim 8, wherein the storage controller is further configured to:
switch the data storage device to an operational mode enabling customer usage of the data storage device.

11. The host storage system of claim 8, wherein the storage controller is further configured to:
automatically enter the configuration mode based on a connection of the data storage device to a power source.

12. The host storage system of claim 8, wherein the environmental parameter data comprises one or more selected from a group consisting of: error signal data, thermal analysis data, vibration data, and workload data including processing workload for one or more of the data storage device and the host storage system.

13. A method comprising:
launching a data storage device in a configuration mode that is usable to program configuration data of the data storage device before the data storage device is usable for workload processing;
receiving from a host system or detecting while in the configuration mode, environmental parameter data associated with an operational environment for the data storage device, wherein the environmental parameter data corresponds to environmental parameters that affect mechanical components that affect read operations or write operations or read and write operations of the data storage device;
and
configuring the data storage device for operation based on custom environmental parameters, including:
configuring the data storage device with custom environmental parameters, based on the environmental parameter data, pertaining to mechanical properties of the data storage device,
writing the custom environmental parameters to non-volatile storage of the data storage device for access by firmware during operation of the data storage device for directing operation of the data storage device, and
formatting the data storage device based on the custom environmental parameters used to adapt the mechanical operation of the data storage device, including rewriting sectors at a particular track pitch or setting new margins for bits per inch.

14. The method of claim 13, wherein:
the data storage device comprises storage media that stores data including the firmware for operation of the data storage device;
the method further comprises operating the data storage device in an operational mode based on results of executed testing processing; and
the operating comprises executing the firmware.

15. The method of claim 13, wherein:
the data storage device comprises storage media that stores data including the firmware;
the method further comprises:
updating the firmware; and
operating the data storage device in an operational mode based on results of executed testing processing; and
the operating comprises executing the updated firmware.

16. The method of claim 15, wherein the updating of the firmware further comprises:
receiving, from the host system, the updated firmware;
writing the updated firmware on the storage media; and
reading, during execution of the data storage device in the operational mode, the updated firmware from the storage media.

17. The method of claim 13, further comprising:
switching the data storage device to an operational mode that enables customer usage of the data storage device.

18. The method of claim 13, wherein the environmental parameter data comprises one or more selected from a group consisting of: error signal data, thermal analysis data, vibration data, and workload data including processing workload for one or more of the data storage device and the host system.

19. A data storage device comprising:
a storage component configured as storage for reading data from and writing data to the storage component; and
a controller component configured for controlling operations of the data storage device including operational access to the storage component, wherein the controller component comprises:
means for launching a configuration mode for the data storage device before the data storage device is usable for workload processing,
means for receiving from a host system or detecting while the data storage device is in the configuration mode, device test data and environmental parameter data associated with an operational environment for the storage device, wherein the environmental parameter data corresponds to environmental parameters that affect mechanical components that affect read operations or write operations or read and write operations of the data storage device,
means for configuring the data storage device based on custom environmental parameters, including:
means for configuring the data storage device with custom environmental parameters, based on the environmental parameter data, pertaining to mechanical properties of the data storage device,
means for writing the custom environmental parameters to non-volatile storage of the data storage device for access by firmware during operation of the data storage device for directing operation of the data storage device, and
means for formatting the data storage device based on the custom environmental parameters used to adapt the mechanical operation of the data storage device, including rewriting sectors at a particular track pitch.

* * * * *